UNITED STATES PATENT OFFICE.

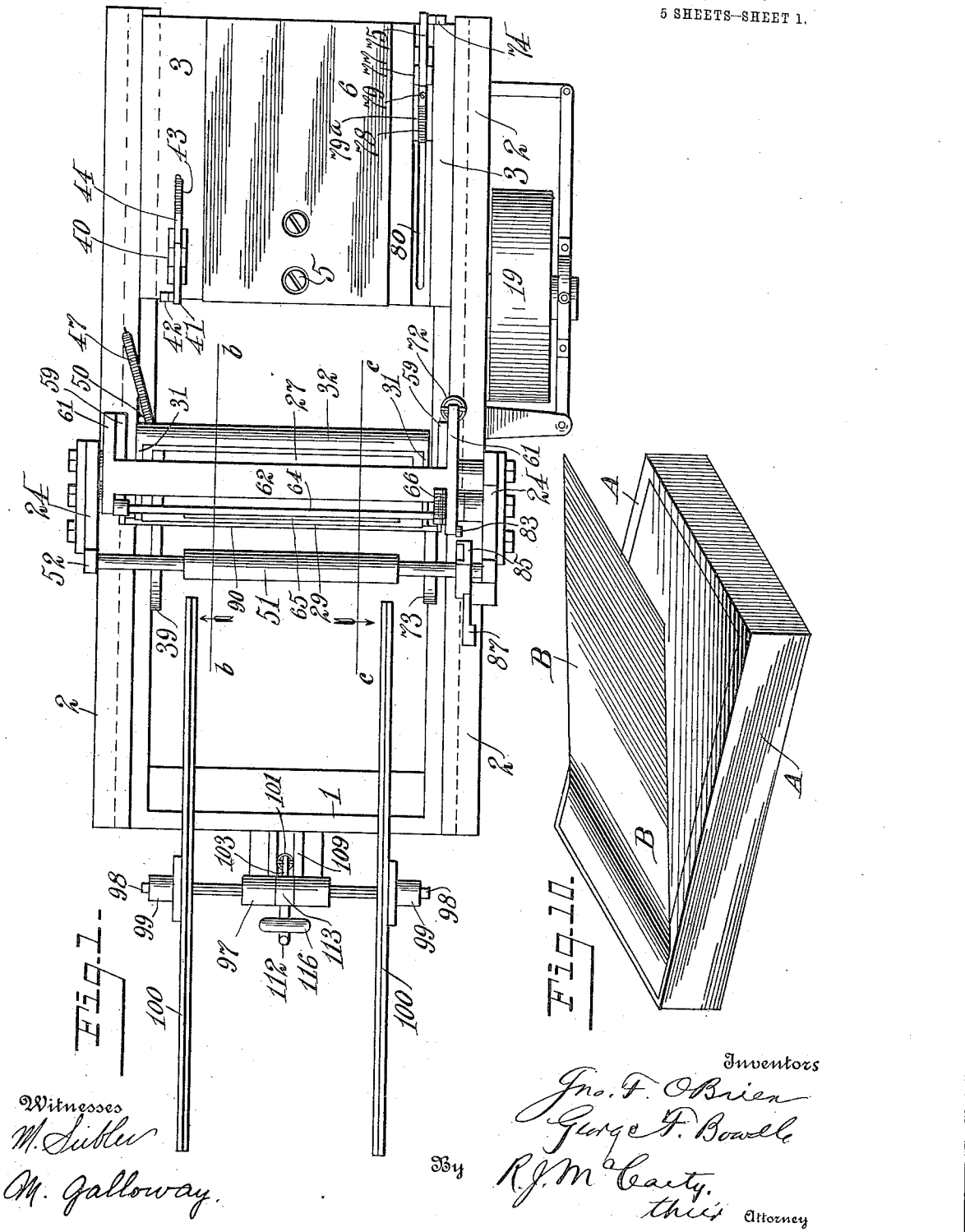

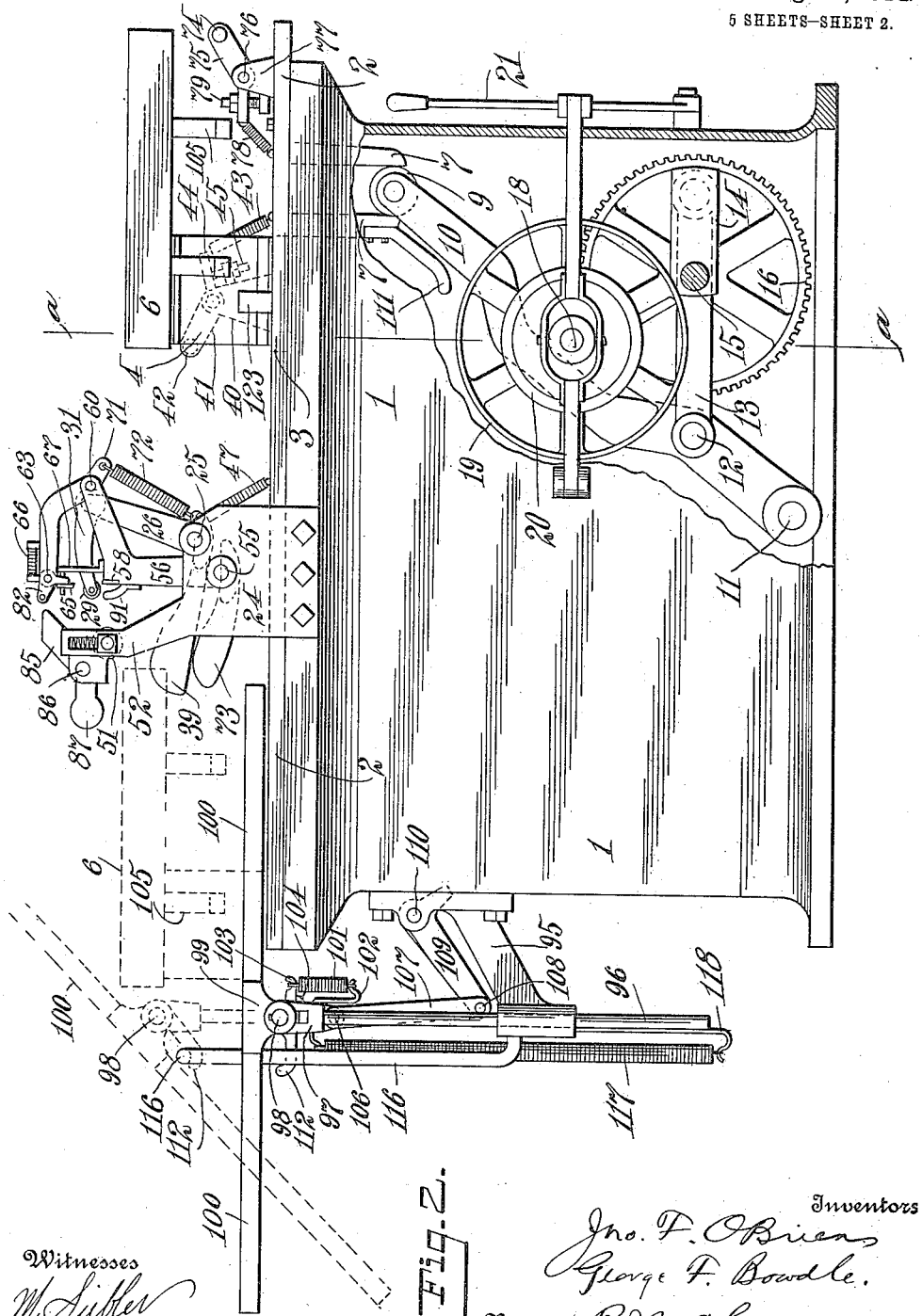

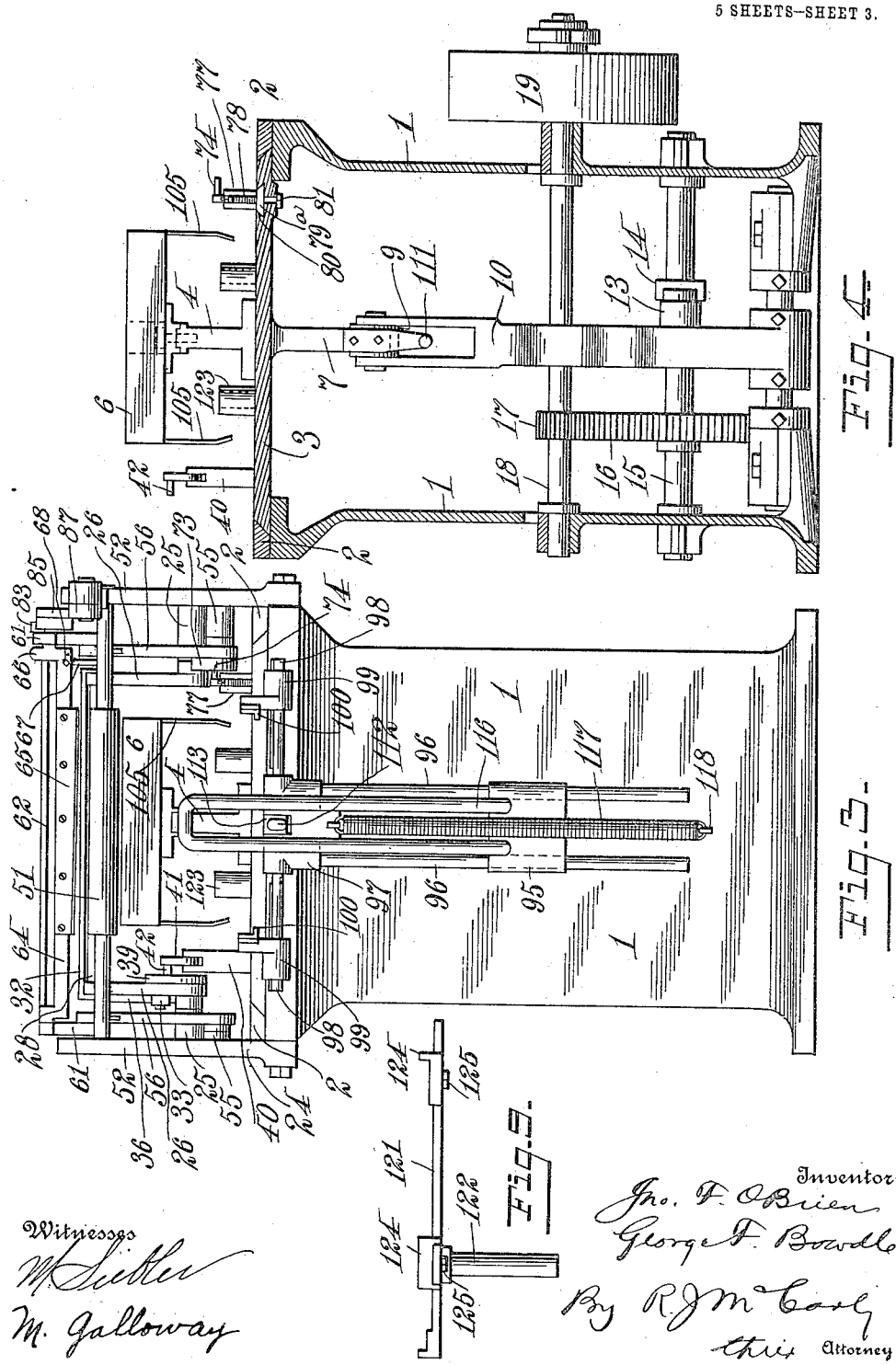

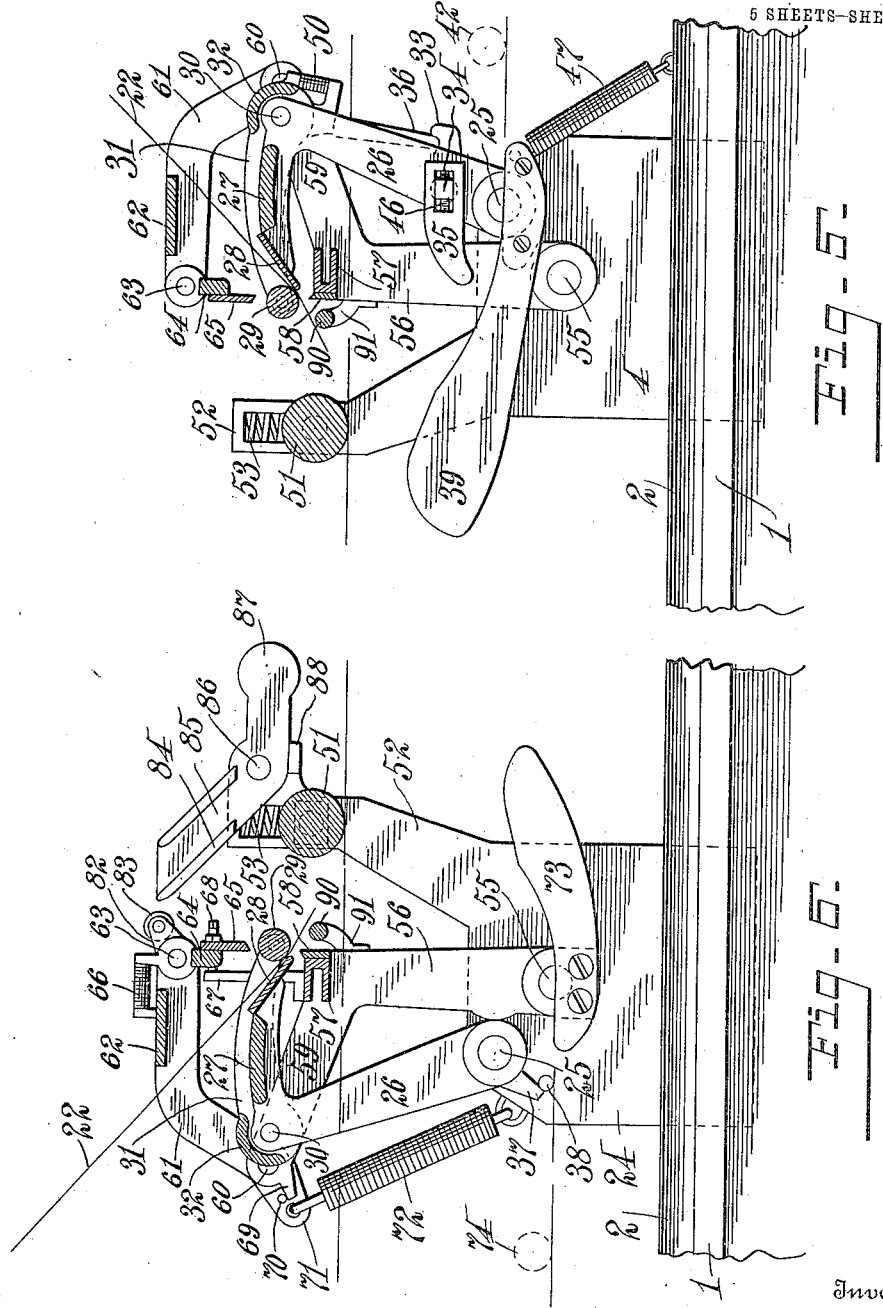

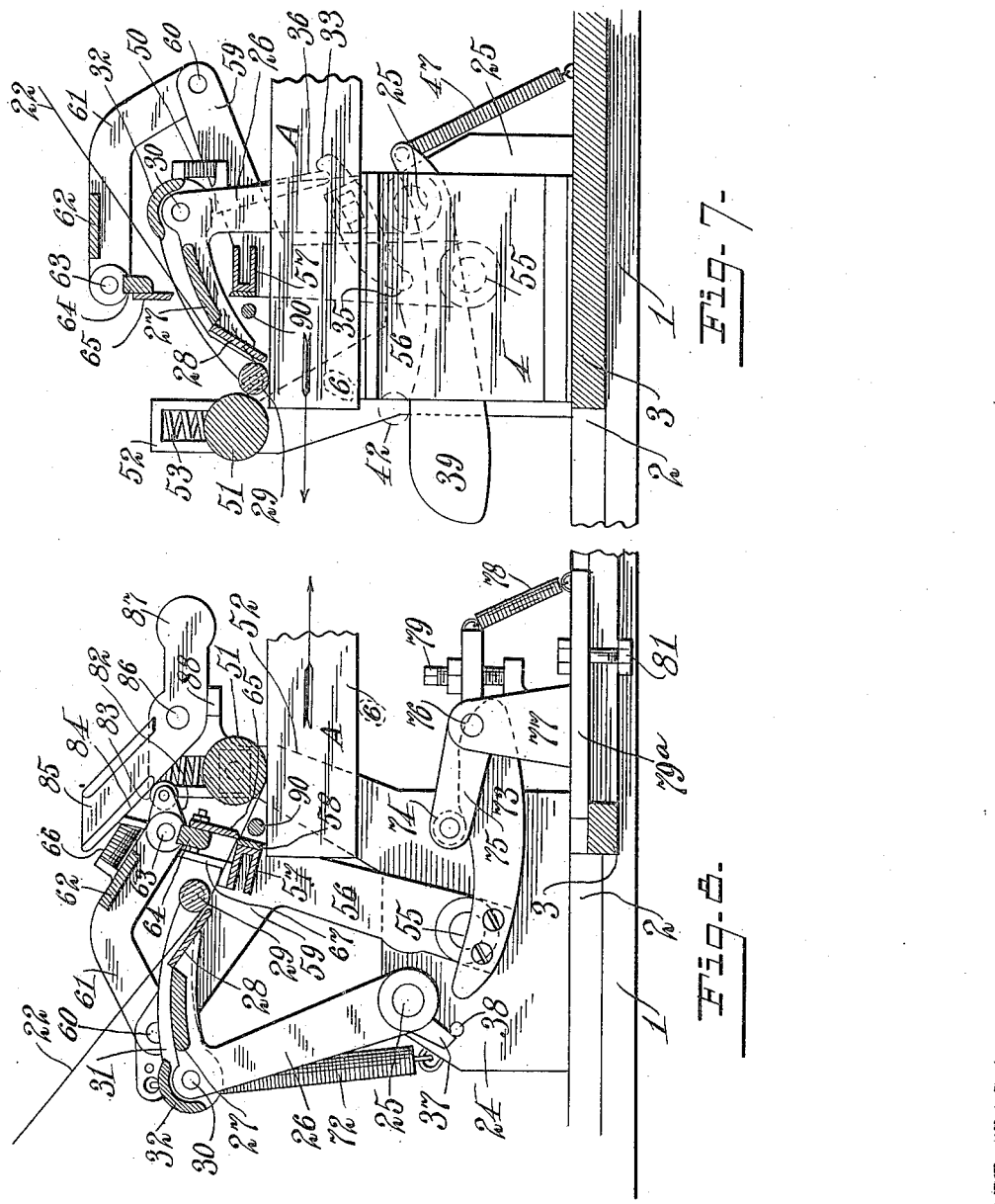

JOHN F. O'BRIEN AND GEORGE F. BOWDLE, OF PIQUA, OHIO, ASSIGNORS OF ONE-HALF TO CHARLES H. F. SCHUTTE, OF PIQUA, OHIO.

BOX-TOPPING MACHINE.

1,106,727.      Specification of Letters Patent.      Patented Aug. 11, 1914.

Application filed May 2, 1912. Serial No. 694,756.

*To all whom it may concern:*

Be it known that we, JOHN F. O'BRIEN and GEORGE F. BOWDLE, citizens of the United States, residing at Piqua, in the county of Miami and State of Ohio, have invented certain new and useful Improvements in Box-Topping Machines; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a machine for attaching the finishing surfaces to cardboard boxes, such, for example, as the tops of such boxes; the surfaces consist usually of paper which is secured thereto by means of a proper adhesive material.

Heretofore, so far as we are aware, the sheets or finished surfaces have been applied to boxes by hand, which manner of application is objectionable both from the standpoint of production and cost thereof.

It is therefore, the object of our invention to provide a machine for doing this class of work, which has obvious advantages, and the special features of which will be hereinafter described in connection with the accompanying drawings, and set forth in the claims.

Referring to the accompanying drawings, Figure 1 is a top plan view of the machine. Fig. 2 is a side elevation of the same, partially in section. Fig. 3 is an end elevation thereof. Fig. 4 is a section, approximately on the line *a—a* of Fig. 2. Fig. 5 is a section on the line *b—b* of Fig. 1. Fig. 6 is a section on the line *c—c* of Fig. 1. Figs. 7 and 8 are views similar to Figs. 5 and 6 respectively, with the parts in a different position. Fig. 9 is a view of a modified form of box support. Fig. 10 is a perspective view of a box showing the strip or sheet of paper applied to the cover thereof.

Referring more particularly to the drawings, 1 represents a base the upper edges of which are provided with guides 2. Adapted to reciprocate in the guides 2 is a plate 3 which carries a standard 4. Attached to the standard 4, by any suitable means, such as screws 5, is a form 6 on which the cardboard box A, to be finished, is placed, Fig. 10. The paper or finishing sheet B is attached to the box during the reciprocation of the plate 3 and the form 6 which are reciprocated by the following means: Extending from the under side of said plate 3 are tracks or projections 7 adapted to be alternately engaged by a roller 9 mounted on the upper end of a lever 10 pivoted at 11 to the base 1, Fig. 2. Pivoted at 12 to said lever 10 is a connecting rod 13 which is also pivoted to a crank 14 on a shaft 15. The shaft 15 is journaled in the base and is provided with a gear 16 in mesh with a pinion 17 on a shaft 18 also journaled in the base. The shaft 18 is provided with a pulley 19 controlled by a friction clutch 20 and a lever 21.

The paper sheets are supplied to the machine in a continuous web 22, the width of which depends upon the width of the box, and is previously coated on its under side with an adhesive substance by means (not shown), but which may be any well known form of paste applying means. The end of the web is held by and is placed on the box in its proper position by the following means: Attached to the upper side edges of the base 1, at approximately intermediate of the center of the length thereof, are side plates 24, Figs. 1 and 2. Pivoted at 25 to the plates 24 is a paper-controlling frame consisting of side members or arms 26, a cross member 27 and a plate 28, Figs. 5 and 6. The web 22 passes between the plate 28 and a roller 29, the said roller 29 being supported by a sub-frame pivoted at 30 to the side members 26 and partially controlled by a spring 50. The said frame consists of side members 31 and a cross member 32. The roller 29 is normally held away from the plate 28 by a catch 33 attached to a short shaft 34 journaled in one of the side members or arms 26. The shaft 34 and catch 33 are controlled by a cam 35 mounted on the shaft 34 and adjustable thereon by means of a screw 46. The catch 33 is engaged by one end of an arm 36, the other end of which is attached to one of the side members 31. The weight of the cam 35 is sufficient to maintain the catch 33 in engagement with the arm 36, as shown in Fig. 5. One of the side members 26 is provided with a projection 37 adapted to engage a pin 38 on one of the side plates 24 when said frame is in its normal position or that shown in Fig. 5.

The said frame is held in and returned to its normal position by a spring 47, shown in Figs. 5 and 7.

The paper-controlling frame, consisting as above, is actuated by a cam 39 attached to one of the side members 26 near its respective pivot 25. The plate 3 is provided with a projection 40, (see Figs. 1 and 3), to which is pivoted an arm 41 which carries a roller 42 adapted to engage the cams 35 and 39, Fig. 5. The arm 41 is partially controlled by a spring 43 and is provided with a projection 44 normally in engagement with an adjustable stop 45, Fig. 2. The stop 45 prevents the roller 42 being elevated from its normal position but permits said roller to be depressed to pass under the cam 39 when the form 6 is returning to its normal position. When the plate 3 and the form 6 carrying the box A are traveling in the direction of the arms shown in Figs. 2, 5 and 7 and reach an intermediate point of their reciprocating movement, the roller 42 initially engages the cam 39 and partially rocks the paper controlling frame, and then engages the cam 35 and actuates the catch 33 thereby releasing the arm 36 thus permitting the spring 50 to clamp the paper web 22 between the roller 29 and plate 28. The continued movement of the roller 42 further actuates the paper-controlling frame and places the end of the adhesive web 22 and the roller 29 in engagement with the card-board box A, the roller 29 engages said box A, the said roller and the sub-frame carrying the same move independently of the paper-controlling frame, thereby separating said roller 29 and the plate 28 and permitting the catch 33 to engage the arm 36 which permits the paper web 22 to freely pass between said roller and plate. It will be noted, that by this arrangement the web of paper is positively located in its proper position on the box, thereby eliminating unevenness and producing a uniform product. When the end of said adhesive web engages the box A, it is attached thereto. The shape of the cam 39 is such, that the roller 29 is maintained in contact with the box, thereby initially pressing the paper web in contact with said box. During the continued movement of the form 6, the paper web is drawn forward by the portion already attached to the box, and is pressed thereon by a pressure roller 51 mounted in arms 52 extending from the side plates 24 and controlled by springs 53.

When a sufficient length of the web has been attached to the box, depending upon the size of the box, the paper is severed by the following means: Pivoted at 55 to the side plates 24 is a paper-cutting frame consisting of side members 56 connected by a cross member 57 which supports a lower cutting blade 58. The side members 56 are provided with extensions 59 to which a sub-frame is pivoted at 60. The said sub-frame consists of side members 61 and a cross member 62. Pivoted at 63 to said side members is a bar 64 to which an upper cutting blade 65 is attached. The bar 64 and the blade 65 are partially controlled by a spring 66 and are guided by a projection 67 engaged by a screw 68 in the bar 64. One of the side members 56 is provided with a projection 69 adapted to be engaged by a pin 70 on an extension 71 of one of the side members 61 when the sub-frame is in its normal or upper position, see Fig. 6. The sub-frame is held in and returned to its normal position by a spring 72 attached to the extension 71 and one of the side plates 24. When the paper-cutting frame is in its normal position, one of the side members 56 engages the hub of one of the pivots 25 of the paper controlling frame, and said paper-cutting frame is held in and returned to its normal position by said spring 72. The object in making the paper-cutting frame movable is to permit the web to be severed while in motion. One of the side members 56 is provided with a cam 73 adapted to be engaged by a roller 74 carried by the plate 3. The roller 74 is attached to an arm 75 pivoted at 76 to a sliding support 77. The arm 75 is partially controlled by a spring 78 and the movement thereof is limited by an adjustable stop 79 which prevents the roller 74 being elevated above a normal position, but which permits the roller to be depressed to pass under the cam 73 when the form 6 is returning to its normal position. The support 77 is slidingly mounted on plate 3 to permit the position of the roller 74 to be adjusted for different lengths of boxes. The said support extends from a plate 79ª mounted in a groove 80 in said plate 3 and is held rigidly in a set position by a bolt 81. When the roller 74 engages the cam 73, the paper-cutting frame will be shifted in the direction of the travel of the paper and at the same speed. The knives 58 and 65 are brought together by the following device. One of the side members 61 is provided with an arm 82 which supports a roller 83 adapted to engage a cam surface 84. The said cam 84 is a portion of a swinging member 85 pivoted at 86 to one of the projections 52 and controlled by a weight 87 and a stop 88. When the paper-cutting frame is rocked or actuated, the roller 83 engages the cam surface 84 and moves the upper cutting blade 65 in engagement with the lower blade 58. When the paper controlling frame reaches the end of its movement, the roller 83 passes to the other side of the cam 84 thereby permitting the spring 72 to separate the blades 58 and 65. The member 85, being pivotally mounted, the cam 84 will release the roller 83 when the paper cutting frame has returned to its normal position.

The paper-carrying frame is provided with a roller or guard 90 supported by brackets 91, and which is adapted to hold the paper away from the lower blade 58, thereby preventing said lower blade scraping the adhesive matter off of the paper web 22. The box A is placed upon the form 6 by hand and is removed after the sheet B (Fig. 10) has been placed thereon, by the following means: Attached to the left end of the machine, as seen in Fig. 2, is a bracket 95 which forms a bearing for vertically sliding rods 96. Attached to the upper ends of said rods 96 is a bearing 97 in which a rock shaft 98 is journaled. Mounted on said shaft 98 are slidable supporting members 99 to which angle bars or tracks 100 are attached. The position of the supporting members 99 and the angle bars 100, depends upon the width of the form 6 and the size of the box. The said bars 100 are so placed, that, when they are elevated, the flanges thereof will engage the sides of the box and strip the same from the form. The said bars 100 are normally in a horizontal position below the level of the form 6, and are held in this position by a spring 101, one end of which is attached to an arm 102 extending from the bearing 97 and the other end of which is attached to a bracket 103 extending from a collar 113 mounted on the shaft 98. The bracket 103 is adapted to engage a projection 104 on the bearing 97 when the bars 100 are in a normal position. The form 6 is provided with guiding members 105 to prevent the flanges of the bars 100 engaging the under edges of the form. The said bars 100 are elevated as follows. Pivoted at 106 to the bearing 97 are the upper ends of links 107, the lower ends of which are pivoted at 108 to one arm of a bell crank lever 109. The said lever 109 is pivoted at 110, and the other arm thereof is adapted to be engaged by a projection 111 extending from one of the projections 7 on the under side of the plate 3. When the projection 111 (Figs. 2 and 4) engages the bell-crank-lever 109, the bars 100 strip the the box from the form; and when said bars reach the end of their upward movement, the shaft 98 is rocked which places said bars at an angle, as shown in dotted lines in Fig. 2, thereby permitting the box to slide from said bars. The shaft 98 is rocked by an arm 112, extending from the collar 113, which is adapted to engage the upper end of a yoke 116 extending from the bracket 95. When the projection 111 releases the lever 109, the bars 100 are depressed by a spring 117, one end of which is attached to the bearing 97 and the other end of which is attached to a bracket 118 extending from the bracket 95. The form 6 is removably mounted on the standard 4 by screws 5 and a form may be provided for each size of box. The said forms are each mounted with the edge 120 in the same position; this permits the roller 42 to always occupy the same relative position. The form is adapted to receive boxes which are made in two portions. To accommodate boxes which are constructed with the top and bottom integral, the form shown in Fig. 9 is provided. This consists of a plate 121 provided with downwardly projecting rods 122 adapted to be received by lugs 123 on the plate 3, (see Fig. 4). The plate 121 is provided with adjustable stops 124 which may be secured in position by bolts 125. The position of the stops 124 may be adjusted to accommodate different sizes of boxes.

Without limiting ourselves to the phrase arrangement shown and described which may be varied within the scope of the claims, we claim—

1. In a machine of the type specified, reciprocating means adapted to support a paper box, paper-controlling means adapted to apply the end of a web of paper to said box, paper-severing means adapted to sever said paper, said paper-controlling and severing means being actuated by said reciprocating means, and means for actuating said reciprocating means and thereby said paper-controlling and severing means.

2. In a machine of the type specified, a reciprocating form adapted to receive a paper box, paper controlling means adapted to apply the end of a web of paper to said box, paper severing means adapted to cut said web, stripping means adapted to remove the box from said form, and means for actuating said form, said paper controlling means, said paper severing means, and said stripping means.

3. In a machine of the type specified, a reciprocating form adapted to receive a paper box, paper controlling means adapted to apply the end of a web of paper to said box, paper severing means adapted to cut said web, means for actuating said form, and means carried by said form and adapted to actuate said paper controlling means and said paper severing means.

4. In a machine of the type specified, a reciprocating form adapted to receive a paper box, paper controlling means adapted to apply the end of a web of paper to said box, paper severing means adapted to cut said web, means for actuating said form, means carried by said form for actuating said paper controlling means, and means carried by said form for actuating said paper severing means, one of said last named means carried by said form, being adjustably mounted.

5. In a machine of the type specified, a reciprocating form adapted to receive a paper box, paper controlling means adapted to apply the end of a web of paper to said box, said means being actuated by said form, paper severing means adapted to cut said web, said last named means being actuated by said form and movable concurrently therewith, and means for actuating said form.

6. In a machine of the type specified, a reciprocating form adapted to receive a paper box, a frame under which said form is adapted to pass, clamping means carried by said frame and adapted to engage a web of paper, and means for actuating said frame to move said clamping means to a position to locate said web on said box.

7. In a machine of the type specified, a reciprocating form adapted to receive a paper box, a frame under which said form may pass, a clamping roller carried by said frame and adapted to engage a web of paper, means for moving said frame to a position to place said roller in engagement with and to locate said web on said box, said roller being adapted to initially press said web on said box.

8. In a machine of the type specified, a reciprocating form adapted to receive a paper box, a frame under which said form may pass, reciprocating clamping means carried by said frame and adapted to engage a web of paper, a cam for moving said frame and said clamping means, a cam for actuating said clamping means, and means carried by said form and adapted to engage said cams to locate said web on said box.

9. In a machine of the type specified, a form adapted to receive a paper box, pivotally mounted bars mounted along the side of said form, means for elevating said bars to remove said box from said form, and means for rocking said bars on their pivots to permit said box to slide from said bars.

10. In a machine of the type specified, a reciprocating form adapted to receive a paper box, pivotally mounted bars mounted along the side of said form, means actuated by said form and adapted to elevate said bars to remove said box from said form, and means for rocking said bars on their pivot when elevated.

11. In a machine of the type specified, a reciprocating form adapted to receive a paper box, bars mounted along the side of said form, a rock shaft upon which said bars are mounted, a bearing for said shaft, a guide for said bearing, means actuated by said form to elevate said bearing and bars, whereby said bars engage said box and remove the same from the form, an arm extending from said bearing, and means adapted to engage said arm to rock said shaft whereby said bars are placed at an angle and said box may slide off said bars.

In testimony whereof we affix our signatures, in presence of two witnesses.

JOHN F. O'BRIEN.
GEORGE F. BOWDLE.

Witnesses:
R. J. McCARTY,
MATTHEW SIEBLER.

---

Copies of this patent may be obtained for five cents each, by addressing the "Commissioner of Patents, Washington, D. C."